US008381192B1

(12) United States Patent
Drewry et al.

(10) Patent No.: US 8,381,192 B1
(45) Date of Patent: Feb. 19, 2013

(54) SOFTWARE TESTING USING TAINT ANALYSIS AND EXECUTION PATH ALTERATION

(75) Inventors: William A. Drewry, Austin, TX (US); Tavis Ormandy, Zurich (CH)

(73) Assignee: Google Inc., Mountain View, CA (US)

( * ) Notice: Subject to any disclaimer, the term of this patent is extended or adjusted under 35 U.S.C. 154(b) by 990 days.

(21) Appl. No.: 12/184,980

(22) Filed: Aug. 1, 2008

Related U.S. Application Data

(60) Provisional application No. 60/953,901, filed on Aug. 3, 2007.

(51) Int. Cl.
*G06F 9/44* (2006.01)

(52) U.S. Cl. ........ 717/128; 717/124; 717/127; 717/129; 717/130; 717/131; 712/233; 712/234; 714/38.1

(58) Field of Classification Search .................. None
See application file for complete search history.

(56) References Cited

U.S. PATENT DOCUMENTS

| | | | | | |
|---|---|---|---|---|---|
| 5,317,740 | A | * | 5/1994 | Sites | 717/129 |
| 5,677,997 | A | * | 10/1997 | Talatik | 706/45 |
| 5,704,034 | A | * | 12/1997 | Circello | 714/38.13 |
| 5,737,516 | A | * | 4/1998 | Circello et al. | 714/38.13 |
| 5,758,061 | A | * | 5/1998 | Plum | 714/35 |
| 5,964,893 | A | * | 10/1999 | Circello et al. | 714/39 |
| 6,026,236 | A | * | 2/2000 | Fortin et al. | 717/127 |
| 6,029,228 | A | * | 2/2000 | Cai et al. | 711/137 |
| 6,106,571 | A | * | 8/2000 | Maxwell | 717/131 |
| 6,189,142 | B1 | * | 2/2001 | Johnston et al. | 717/125 |
| 6,519,766 | B1 | * | 2/2003 | Barritz et al. | 717/130 |
| 6,748,583 | B2 | * | 6/2004 | Aizenbud-Reshef et al. | 717/127 |
| 6,779,108 | B2 | * | 8/2004 | Ju et al. | 712/239 |
| 6,865,666 | B2 | * | 3/2005 | Yoshida et al. | 712/234 |
| 7,124,406 | B2 | * | 10/2006 | Ryu | 717/144 |
| 7,707,557 | B1 | * | 4/2010 | Nikolov | 717/130 |
| 7,788,646 | B2 | * | 8/2010 | Ward | 717/132 |
| 7,831,817 | B2 | * | 11/2010 | Biles | 712/240 |
| 7,979,844 | B2 | * | 7/2011 | Srinivasan | 717/119 |
| 2002/0002670 | A1 | * | 1/2002 | Yoshida et al. | 712/245 |
| 2002/0066081 | A1 | * | 5/2002 | Duesterwald et al. | 717/128 |
| 2003/0023959 | A1 | * | 1/2003 | Park | 717/151 |
| 2003/0182541 | A1 | * | 9/2003 | Magoshi | 712/226 |
| 2005/0081080 | A1 | * | 4/2005 | Bender et al. | 714/2 |
| 2007/0074169 | A1 | * | 3/2007 | Chess et al. | 717/126 |
| 2007/0074188 | A1 | * | 3/2007 | Huang et al. | 717/141 |
| 2008/0115115 | A1 | * | 5/2008 | Codrescu et al. | 717/128 |

OTHER PUBLICATIONS

Title: FINE: A fault injection and monitoring environment for tracing the UNIX system behavior under faults, author: Kao, W.-I et al, source: IEEE, dated: Nov. 1993.*
Newsome, James et al., "Dynamic Taint Analysis for Automatic Detection, Analysis, and Signature Generation of Exploits on Commodity Software", http://valgrind.org/docs/newsome2005.pdf, viewed Oct. 1, 2008.
Godefroid, Patrice et al., "Automated Whitebox Fuzz Testing", http://research.microsoft.com/users/pg/public_psfiles/ndss2008.pdf, viewed Oct. 1, 2008.

(Continued)

*Primary Examiner* — Chameli Das
(74) *Attorney, Agent, or Firm* — Honigman Miller Schwartz and Cohn LLP

(57) ABSTRACT

Some embodiments of the present invention provide a system that tests a software program. During operation, the system traces a flow of tainted data through the software program during execution of the software program. Next, the system alters the flow by modifying an instruction within the software program. The system then monitors the behavior of the software program after modifying the instruction. Finally, the system analyzes a correctness of the software program based on the monitored behavior.

22 Claims, 3 Drawing Sheets

OTHER PUBLICATIONS

Molnar, David et al., "Catchconv: Symbolic execution and run-time type inference for integer conversion errors", Technical Report No. UCB/EECS-2007-23, http://www.eecs.berkeley.edu/Pubs/TechRpts/2007/EECS-2007-23.pdf, viewed Oct. 1, 2008.

D. Aitel. The advantages of blockbased protocol analysis for security testing. http://www.immunitysec.com/resources-papers.shtml, 2002.

D. Aitel. Spike. http://www.immunitysec.com/resourcesfreesoftware.shtml, 2003.

Beyond Security, Inc. Bestorm 2.0 whitepaper. http://www.beyondsecurity.com/bestorm whitepaper.html, Sep. 2006.

R. S. Boyer, B. Elspas, and K. N. Levitt. Select: a formal system for testing and debugging programs by symbolic execution. In Proceedings of the international conference on Reliable software, pp. 234-245, New York, NY, USA, 1975. ACM Press.

Y. Goland, E. Whitehead, A. Faizi, S. Carter, and D. Jensen. Http extensions for distributed authoring—webday. http://www.ietf.org/rfc/rfc2518.txt, Feb. 1999.

B. Miller, L. Fredriksen, and B. So. An empirical study of the reliability of unix utilities. pp. 32-44, Dec. 1990.

D. A. Molnar and D.Wagner. Catchconv: Symbolic execution and run-time type inference for integer conversion errors. Technical Report UCB/EECS-2007-23, EECS Department, University of California, Berkeley, Feb. 4, 2007.

A. Moser, C. Kruegel, and E. Kirda. Exploring multiple execution paths for malware analysis. sp, 0:231-245, 2007.

N. Nethercote and J. Seward. Valgrind: A framework for heavyweight dynamic binary instrumentation. In Proceedings of PLDI 2007, San Diego, California, USA, Jun. 2007.

J. Newsome and D. Song. Dynamic taint analysis for automatic detection, analysis, and signature generation of exploits on commodity software. In *Proceedings of the Network and Distributed System Security Symposium* (NDSS 2005), 2005.

J. Röning, M. Lasko, A. Takanen, and R. Kaksonen. Protos—systematic approach to eliminate software vulnerabilities. In *Invited presentation at Microsoft Research*, Seattle, USA, May 2002.

J. Seward and N. Nethercote. Using valgrind to detect undefined value errors with bit-precision. In Proceedings of the USENIX'05 Annual Technical Conference, Anaheim, California, USA, Apr. 2005.

The MITRE Corporation. CVE-2006-3459. http://cve.mitre.org/cgi-bin/cvename.cgi?name=CVE-2006-3459, Jul. 2006.

The MITRE Corporation. CVE-2006-3460. http://cve.mitre.org/cgi-bin/cvename.cgi?name=CVE-2006-3460, Jul. 2006.

The MITRE Corporation. CVE-2006-3461. http://cve.mitre.org/cgi-bin/cvename.cgi?name=CVE-2006-3461, Jul. 2006.

The MITRE Corporation. CVE-2006-3462. http://cve.mitre.org/cgi-bin/cvename.cgi?name=CVE-2006-3462, Jul. 2006.

The MITRE Corporation. CVE-2006-3463. http://cve.mitre.org/cgi-bin/cvename.cgi?name=CVE-2006-3463, Jul. 2006.

The MITRE Corporation. CVE-2006-3464. http://cve.mitre.org/cgi-bin/cvename.cgi?name=CVE-2006-3464, Jul. 2006.

The MITRE Corporation. CVE-2006-3465. http://cve.mitre.org/cgi-bin/cvename.cgi?name=CVE-2006-3465, Jul. 2006.

The MITRE Corporation. CVE-2006-4343. http://cve.mitre.org/cgi-bin/cvename.cgi?name=CVE-2006-4343, Aug. 2006.

The MITRE Corporation. CVE-2006-4924. http://cve.mitre.org/cgi-bin/cvename.cgi?name=CVE-2006-4924, Sep. 2006.

The MITRE Corporation. CVE-2006-5793. http://cve.mitre.org/cgi-bin/cvename.cgi?name=CVE-2006-5793, Nov. 2006.

M. Vuagnoux. Autodafé: an act of software torture. Technical report, Swiss Federal Institute of Technology (EPFL), Cryptograhy and Security Laboratory (LASEC), Aug. 2006.

M. Weiser. *Program Slices: Formal, Psychological, and Practical Investigations of an Automatic Program Abstraction Method*. PhD thesis, 1979.

"Flayer: Exposing Application Internals," Will Drewry and Tavis Ormandy, WOOT '07 Proceedings of the first USENIX workshop on Offensive Technologies, Article No. 1, USENIX Association Berkeley, CA, USA © 2007.

Gnu gdb. http://www.gnu.org/software/gdb/. Accessed on Jul. 1, 2007.

Libtiff. http://www.remotesensing.org/libtiff/. Accessed on Jul. 22, 2011.

Openssh. http://www.openssh.org. Accessed on Jul. 18, 2011.

C. Cadar, V. Ganesh, P. M. Pawlowski, D. L. Dill, and D. R. Engler. Exe: automatically generating inputs of death. In *Proceedings of the 13th ACM conference on Computer and communications security*, pp. 322-335, Alexandria, Virginia, USA, 2006.

J. DeMott and Applied Security, Inc., "Evolutionary fuzzing system," http://appliedsec.com/resources.html, May 2007.

M. Eddington., "Peach," http://peachfuzz.sourceforge.net/README.txt, May 2004.

P. Godefroid, M. Levin, and D. Molnar, "Automated whitebox fuzz testing," Technical Report MSR-TR-2007-58, Microsoft, May 2007.

L. "pusscat" Grenier and Lin0xx. Byakugan: Automating exploitation. In *ToorCon Seattle*, Pioneer Square, Seattle, Washington, USA, May 2007.

* cited by examiner

SOFTWARE TESTING USING TAINT ANALYSIS AND EXECUTION PATH ALTERATION

RELATED APPLICATION

This application hereby claims priority under 35 U.S.C. §119 to U.S. Provisional Patent Application. No. 60/953,901, filed on 3 Aug. 2007, entitled "Flaying," by inventors William Drewry and Tavis Ormandy.

BACKGROUND

1. Field of the Invention

The present invention relates to techniques for software testing. More specifically, the present invention relates to a method and system for fault detection in software programs using bit-precise taint analysis and execution flow redirection.

2. Related Art

Taint analysis is typically used to detect exploits of security vulnerabilities in computer systems. In particular, dynamic taint analysis techniques typically involve tracing untrusted, or tainted, data during execution of software programs in the computer systems. For example, tainted data may originate from sources such as user input, network packets, and/or file system and device data. If the tainted data is used in a way that violates a security policy of a software program, a potential exploit may be found. Furthermore, because taint tracing is based on the software program's dynamic behavior rather than attack signatures of known exploits, taint tracing may detect both known attacks and future attacks on the software program.

However, existing dynamic taint analysis techniques have a number of drawbacks. First, interpreter- and architecture-based taint analysis techniques are constrained by supported languages and hardware, respectively. Next, taint analysis tools are typically configured to detect attacks and associated vulnerabilities on a software program at the time of use. As a result, taint analysis tools may be unable to detect faults and vulnerabilities prior to use of the software program. In addition, executing software programs using taint analysis tools may incur a significant performance penalty (e.g., 10-40 times slower than normal) due to instrumentation and tracing overhead. This overhead may be further increased by flow redirection mechanisms that involve solving for inputs to direct control flow instructions in the software program to the appropriate branches.

Hence, there is a need to improve taint analysis tools for broader applicability of taint analysis techniques and reduced performance overhead.

SUMMARY

Some embodiments of the present invention provide a system that tests a software program. During operation, the system traces a flow of tainted data through the software program during execution of the software program. Next, the system alters the flow by modifying an instruction within the software program. The system then monitors the behavior of the software program after modifying the instruction. Finally, the system analyzes a correctness of the software program based on the monitored behavior.

In some embodiments, the system also assigns taint to the tainted data based on a data source associated with the software program.

In some embodiments, the data source corresponds to at least one of a network, a file system, application memory, and standard input.

In some embodiments, the system also provides generated data as input to the software program.

In some embodiments, the generated data corresponds to random data.

In some embodiments, the flow is altered automatically or by a user.

In some embodiments, tracing and altering the flow of tainted data involve instrumenting the software program.

In some embodiments, altering the flow corresponds to at least one of altering a conditional jump instruction and stepping over a function call.

In some embodiments, analyzing the correctness of the software program involves detecting faults in the software program.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for testing a software program, such as an application, a library, a database, an operating system, and/or a device driver. More specifically, embodiments of the invention provide a method and system for analyzing the correctness of the software program using taint tracing and execution path alteration. Taint tracing may be performed by tracing a flow of tainted data through the software program during execution of the software program. In addition, the flow may be altered by modifying instructions directly within the software program. As a result, embodiments of the present invention may enable code along complex code paths to be directly tested using techniques such as fuzz testing.

Figure 1:
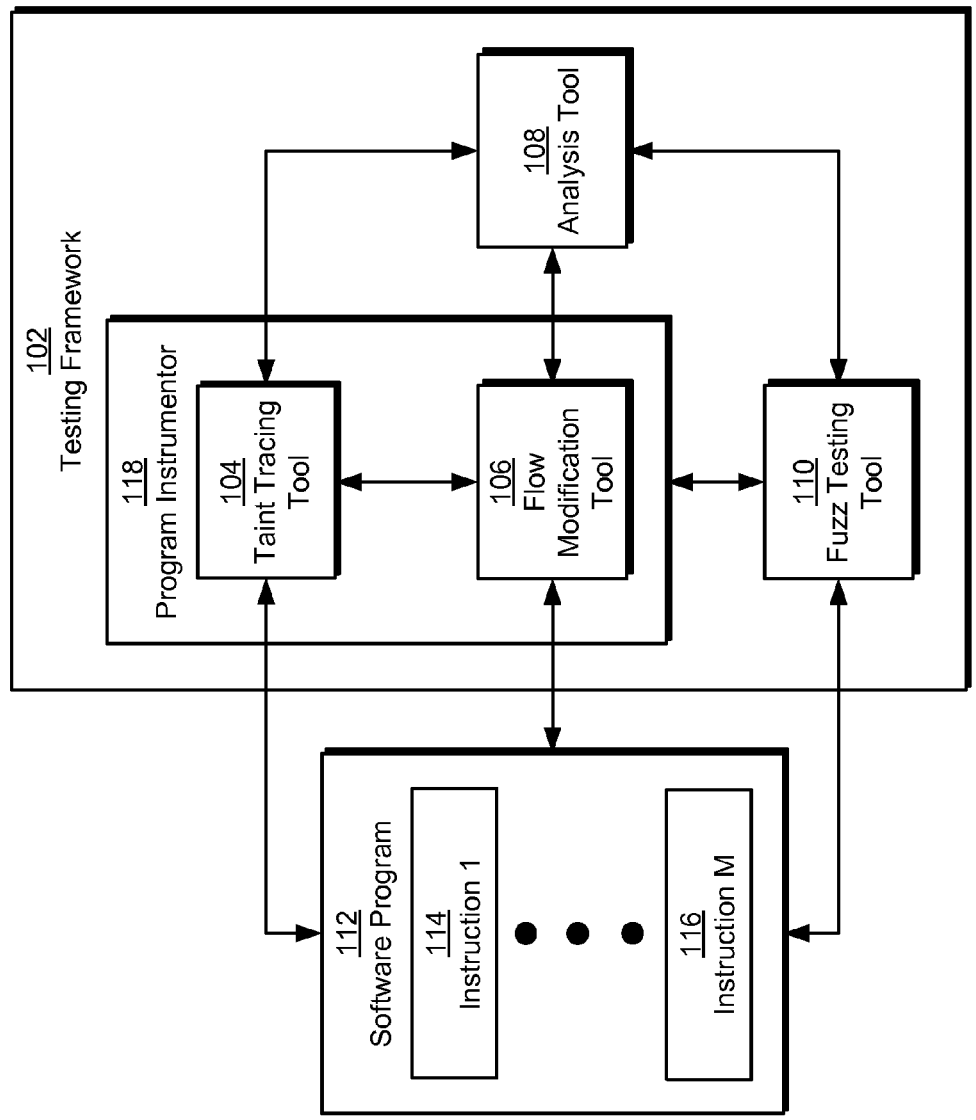
FIG. 1 shows a schematic of a system in accordance with an embodiment of the present invention.

FIG. 1 shows a schematic of a system in accordance with an embodiment of the present invention. As shown in FIG. 1, the system includes a testing framework 102 for testing a software program 112. Testing framework 102 further includes a program instrumentor 118, an analysis tool 108, and a fuzz testing tool 110. Each of these components is described in further detail below.

Software program 112 may correspond to a standalone application, operating system, enterprise application, database, library, device driver, and/or other type of software. In addition, software program 112 may be executed in a variety of environments. For example, software program 112 may be executed on a single desktop computer or workstation, or software program 112 may be distributed across multiple servers within a data center.

Software program 112 includes a set of instructions (e.g., instruction 1 114, instruction m 116). Each instruction may correspond to an element of software program 112 that is executed by a processor (e.g., a central processing unit (CPU)) to implement the functionality of software program 112. In other words, the instructions may correspond to machine code instructions, bytecode instructions, and/or other executable operations that make up software program 112.

Those skilled in the art will appreciate that software program 112 may include a number of bugs, faults, and/or vulnerabilities. The bugs, faults, and/or vulnerabilities may cause software program 112 to execute incorrectly, crash, hang, and/or grant access to unauthorized applications or users. As a result, the development process of software program 112 may involve testing to detect defects in software program 112. Defects found through testing may then be fixed (e.g., patched) to improve the performance and correctness of software program 112.

In one or more embodiments of the invention, testing framework 102 is used to test software program 112 for bugs, faults, vulnerabilities, and/or other defects. The operation of testing framework 102 may be automated and/or manually controlled by a user. For example, testing framework 102 may include a command line interface (CLI) that accepts commands related to testing of software program 112 from the user and/or a graphical user interface (GUI) that interacts with the user through graphical objects such as menus, buttons, windows, toolbars, and/or other GUI elements. Alternatively, some or all of the testing activities performed by testing framework 102 may be automated by a script associated with testing framework 102. Regardless of the mode of operation, testing framework 102 may test software program 112 using taint analysis, execution path alteration, and/or fuzz testing techniques, as discussed below.

In one or more embodiments of the invention, testing of software program 112 by testing framework 102 involves instrumenting software program 112. In particular, program instrumentor 118 may be used to add instructions (e.g., instruction 1 114, instruction m 116) to software program 112 for testing purposes. Furthermore, program instrumentor 118 may instrument software program 112 by translating uninstrumented instructions (e.g., machine code instructions) from software program 112 into an intermediate representation, applying instrumentation to the intermediate representation, and translating the intermediate representation back into executable instructions. For example, program instrumentor 118 may correspond to the Valgrind programming tool that translates machine code into UCode, instruments the UCode, and then translates the UCode back into machine code. Alternatively, the functionality of program instrumentor 118 may be implemented using a tracing utility such as ptrace.

Within program instrumentor 118, taint tracing tool 104 may be used to assign taint to data used by software program 112. The taintedness of the data may be based on a data source from which the data is obtained. For example, the data source may correspond to a network, a file system, and/or standard input. Furthermore, tainting of data may be based on a file descriptor associated with the data source. As a result, data originating from file descriptor 0 may be tainted if standard input tainting is specified. Similarly, file descriptor tracking for network and file tainting may be implemented through instrumentation of system calls such as open, socket, connect, accept, socketpair, and close. Taint tracing tool 104 may additionally include functionality to filter file and network input data for tainting. For example, taint tracing tool 104 may only taint data originating from a specific path or network address (e.g., Internet Protocol (IP) address). Finally, taint tracing tool 104 may also taint blocks of application memory upon receiving client requests (e.g., Valgrind client requests), such as malloc and free, from software program 112.

After taint is assigned to the data, taint tracing tool 104 may trace the flow of tainted data through software program 112 during execution of software program 112. In other words, taint tracing tool 104 may perform dynamic taint analysis on software program 112. Moreover, the tracing of tainted data by taint tracing tool 104 may be based on a memory checking tool associated with program instrumentor 118, such as the Memcheck tool for Valgrind. In particular, the tracing of tainted data in software program 112 may be implemented using the tracing of memory validity or definedness from the memory checking tool. For example, taintedness may be propagated using the valid-value (V) bits of Memcheck. Consequently, taint tracing tool 104 may provide bit-precise taint analysis of data within software program 112. On the other hand, taint tracing tool 104 may implement bit-precise taint analysis independently of memory checking tools and/or other tools.

Those skilled in the art will appreciate that propagation of taintedness may not correspond exactly to the propagation of memory validity. As a result, taint tracing tool 104 may include replacements for certain functions from the memory check tool that do not propagate memory invalidity but should propagate taintedness, such as strlen, strnlen, strncmp, strcmp, memcmp, and/or bcmp. Such replacement functions may use client requests to determine if the source memory is tainted and taint the return value appropriately. For example, the replacement functions may allow the variable len to be tainted in the following sample code if the variable s is tainted:

char *c=s; size_t len=0;
for( ; *c; c++) {len++;}
return len;

Untainting of data may also be provided by the taint propagation mechanism in taint tracing tool 104. More specifically, the writing of an untainted value to a tainted memory location may untaint the memory location. Memory may also be untainted when the memory is allocated or freed and/or through the handling of other client requests by taint tracing tool 104 and/or program instrumentor 118.

Taint tracing tool 104 may also generate notification messages regarding traversed conditional jumps, system call argument usage, memory access, and/or register memory loads. The notification messages may be used by flow modification tool 106 to redirect the flow of tainted data through testing framework 102 and/or analysis tool 108 to analyze the correctness of software program 112, as explained below. As with taint propagation, message generation within taint tracing tool 104 may be based on the message generating capabilities of a memory checking tool such as Memcheck. Alternatively, message generation may be implemented independently of the memory checking tool to provide added functionality to messages from taint tracing tool 104 to users, scripts, and/or other components associated with testing framework 102.

In addition, flow modification tool 106 may be used to alter the flow of tainted data through software program 112. The flow alteration may be facilitated by traversal of instructions within software program 112 by taint tracing tool 104. To alter the execution path (i.e., flow) of software program 112, flow modification tool 106 may instrument one or more instructions in software program 112 through program instrumentor 118. In other words, flow modification tool 106 may change the execution path of software program 112 at a control flow instruction by directly modifying the control flow instruction rather than modifying an input value at the control flow instruction. As a result, execution path alteration in software program 112 may be achieved by flow modification tool 106 without the overhead associated with calculating appropriate input values at control flow instructions.

In one or more embodiments of the invention, flow modification tool 106 may alter the flow of software program 112 by altering a conditional jump instruction and/or stepping over a function call. Addresses of the conditional jump instruction and/or function call may be obtained by taint tracing tool 104 during taint analysis and provided to flow modification tool 106. To alter the conditional jump instruction, flow modification tool 106 may explicitly specify if a branch at the conditional jump instruction is to be followed. For example, the following command may be used by flow modification tool 106 to cause software program 112 to take the branch at address 0x8080 but not the branch at address 0x9090:

alter-branch=0x8080:1, 0x9090:0

To step over a function call, flow modification tool 106 may add instructions that cause the function call to be bypassed. For example, flow modification tool 106 may obtain a memory address of the function call from a user, script, and/or taint tracing tool 104. Flow modification tool 106 may then add instructions to software program 112 that cause a jump to the next physical instruction after the call site while providing a controllable return value (e.g., the address of the function call). Taint analysis of the reinstrumented instructions in software program 112 may then resume to traverse other code paths of software program 112.

During the execution, tracing, and/or redirection of software program 112 by program instrumentor 118, taint tracing tool 104, and/or flow modification tool 106, analysis tool 108 may monitor the behavior of software program 112. For example, analysis tool 108 may monitor the behavior of software program 112 by obtaining messages generated by program instrumentor 118, taint tracing tool 104, and/or flow modification tool 106.

The monitored behavior may then be used by analysis tool 108, a user, and/or a script associated with testing framework 102 to further test software program 112 and/or analyze the correctness of software program 112. For example, the monitored behavior may include memory addresses traversed by taint tracing tool 104 that correspond to control flow instructions. The memory addresses may then be used by flow modification tool 106 to change the execution path of software program 112 and expose other areas of software program 112 to testing. Along the same lines, messages containing locations of tainted values, traversed conditional jumps, crashes, hangs, and/or other errors associated with software program 112 may allow faults to be detected by analysis tool 108, the user, and/or the script.

Software program 112 may further be tested by providing generated data as input to software program 112. The generated data may correspond to random data that is obtained from fuzz testing tool 110. Alternatively, the generated data may be formatted to represent acceptable data, such as data corresponding to a particular network protocol. The generated data may then be used to detect vulnerabilities in software program 112 by fuzz testing tool 110.

More specifically, fuzz testing techniques may be applied to software program 112 by fuzz testing tool 110 after basic error checks have been removed by flow modification tool 106. In other words, taint tracing tool 104 and flow modification tool 106 may be used to reach code within complex execution paths for fuzz testing by fuzz testing tool 110. For example, a Secure Shell Daemon (SSHD) may be tested by bypassing a Secure Shell (SSH) protocol version check using flow modification tool 106 and subsequently sending generated data from fuzz testing tool 110 to the SSHD.

Those skilled in the art will appreciate that testing framework 102 may further be used in a variety of auditing and testing techniques. For example, taint tracing tool 104 and flow modification tool 106 may be used in guided source code vulnerability auditing to determine input entry points and input-tainted functions in software system 112. Taint tracing tool 104 and flow modification tool 106 may similarly be used in patch vulnerability analysis by supplying bad input to two variants (e.g., patched and unpatched) of an application. Differences in code flow between the two variants may be observed and specific behavior may be forced to locate vulnerable code in either variant.

Figure 2:
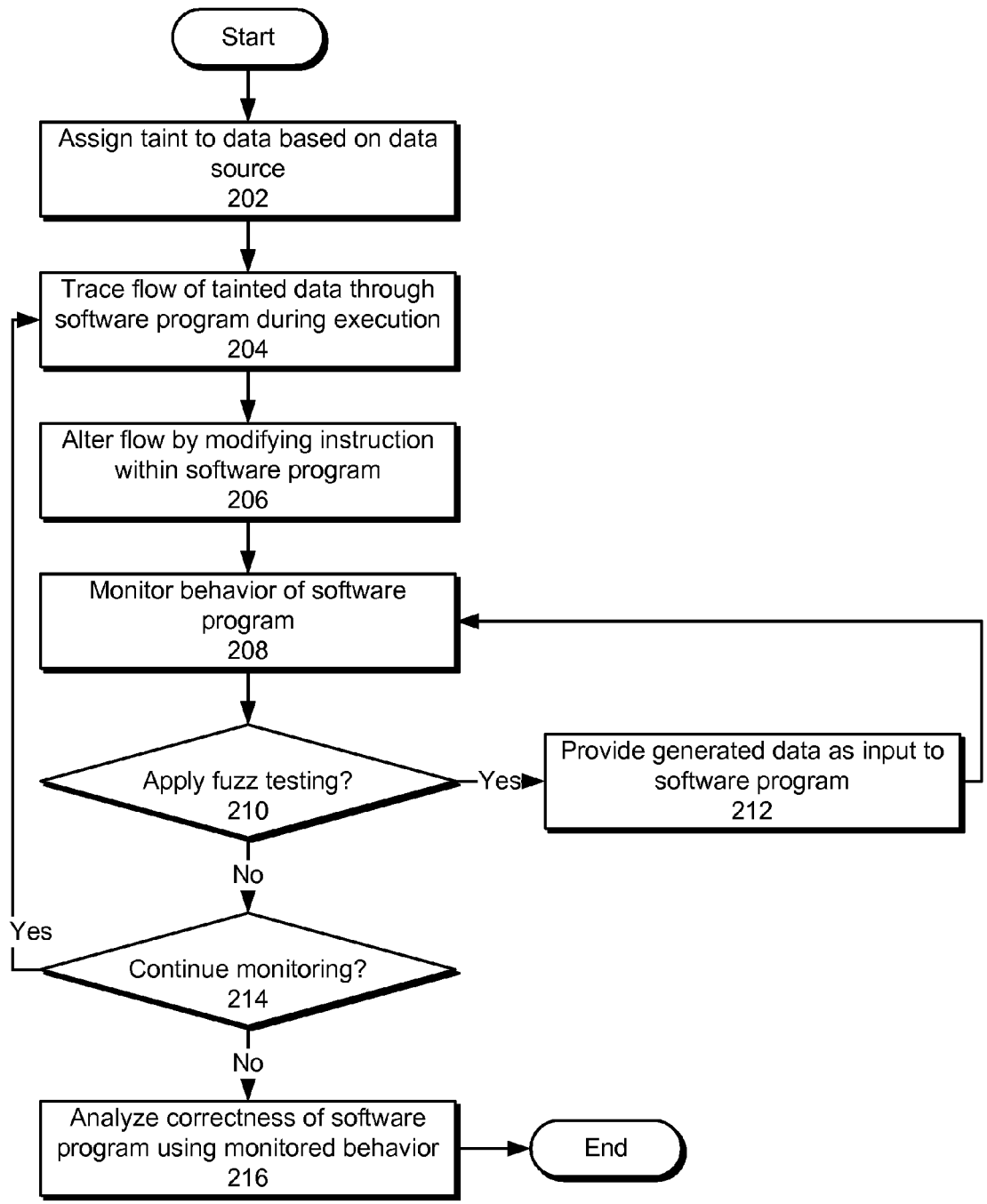
FIG. 2 shows a flowchart illustrating the process of testing a software program in accordance with an embodiment of the present invention.

FIG. 2 shows a flowchart illustrating the process of testing a software program in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, taint is assigned to data in the software program based on a data source associated with the software program (operation 202). The data source may correspond to a network, a file system, application memory, and/or standard input. Tainting of data may further be filtered based on criteria such as a path of an input file and/or a network address associated with a packet.

Next, the flow of tainted data through the software program is traced during execution of the software program (operation 204). The tracing of tainted data may be used to determine input entry points and/or conditional jumps traversed by the tainted data. The flow is then altered by modifying an instruction within the software program (operation 206). As described above, the tracing of tainted data and the alteration of flow within the software program may be performed by instrumenting the software program. The alteration of flow may also be performed automatically or by a user.

The flow may be altered by altering a conditional jump instruction and/or stepping over a function call encountered during taint tracing. Once the conditional jump instruction and/or function call is altered, subsequent taint tracing of the software program may take a specific branch at the conditional jump instruction and/or bypass the function call. As a result, version checks, error checks, and/or other basic defenses of the software program may be removed by altering the conditional jump instructions associated with the defenses.

The behavior of the software program is also monitored (operation 208). Monitoring of the software program's behavior may also begin with the tracing of tainted data (operation 204) within the software program. For example, the software program's behavior may be monitored by receiving messages generated during taint analysis of the software program.

Fuzz testing may be applied to the software program (operation 210) as the behavior of the software program is monitored. In particular, fuzz testing may be performed on code within the software program that is reached by taint tracing and execution path alteration techniques in operations 204-206. The generated data may correspond to random data and/or formatted data that is acceptable to the software program. The generated data may then be provided as input to the software program (operation 212) to discover vulnerabilities in the software program, such as infinite loops, integer overflows, and/or denial of service vulnerabilities.

During fuzz testing, the behavior of the software is continually monitored (operation 208). Furthermore, multiple rounds of generated data may be provided as input to the software program (operations 210-212) for thorough testing of the software program's code.

The software program's behavior may continue to be monitored (operation 214) after fuzz testing is performed (operations 210-212) or if fuzz testing is skipped. If monitoring is to continue, taint tracing and flow modification may be performed (operations 204-206) through instrumentation and subsequent execution of the software program, the behavior of the software program may be monitored (operation 208) during execution, and fuzz testing may be applied to the software program (operations 210-212) at various points of execution. Monitoring may stop once testing of the software program is complete. For example, monitoring may stop when important code paths in the software program have been executed and fuzz tested. Alternatively, monitoring may stop when all reachable code has been traversed in the software program.

The correctness of the software program is then analyzed using the monitored behavior (operation 216). Analysis of correctness may be performed by a user, a script, and/or an analysis tool. In particular, analysis of correctness may involve fault detection, patch vulnerability analysis, source code vulnerability auditing, and/or other techniques related to security and quality assurance (QA).

Figure 3:
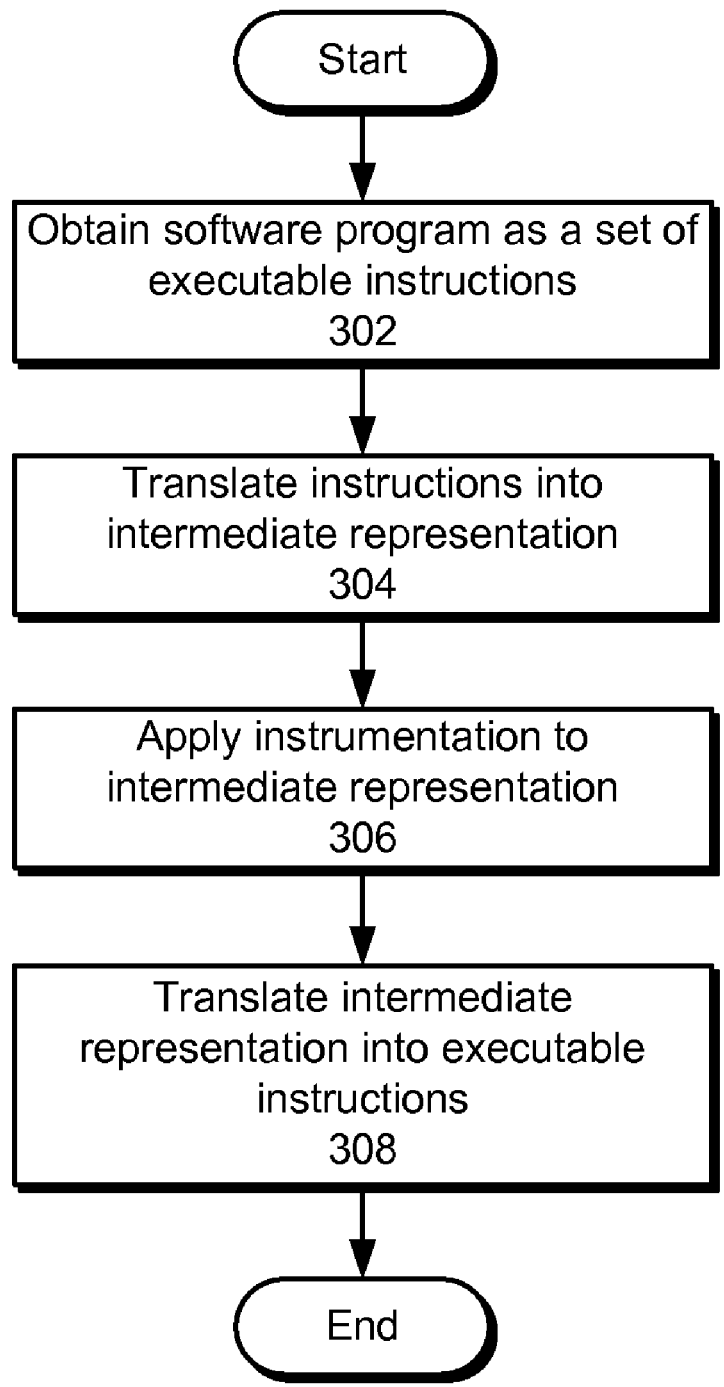
FIG. 3 shows a flowchart illustrating the process of instrumenting a software program in accordance with an embodiment of the present invention.

FIG. 3 shows a flowchart illustrating the process of instrumenting a software program in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, the software program is obtained as a set of executable instructions (operation 302). The executable instructions may correspond to machine code instructions, bytecode instructions, and/or other executable elements of the software program. Next, the instructions are translated into an intermediate representation (operation 304), such as UCode.

Instrumentation is then applied to the intermediate representation (operation 306). As described above, the instrumentation may be used to trace tainted data within the software program and/or redirect the flow of data in the software program. The instrumentation may also be used to perform fuzz testing of code in the software program. Finally, the instrumented intermediate representation is translated back into executable instructions (operation 308) for testing, source code auditing, and/or other purposes associated with analyzing the correctness of the software program.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for testing a software program, comprising:
   tracing a flow of tainted data through the software program with a processor during execution of the software program;
   altering the flow by modifying a conditional jump instruction without modifying an input value to the conditional jump instruction within the software program based on the tracing, wherein one or more instructions of the software program that were executed during the tracing are not executed during a subsequent execution of the software program after the conditional jump instruction was modified;
   monitoring a behavior of the software program during the subsequent execution after the conditional jump instruction was modified; and
   analyzing a correctness of the software program using the monitored behavior.

2. The method of claim 1, further comprising:
   assigning taint to the tainted data based on a data source associated with the software program.

3. The method of claim 2, wherein the data source corresponds to at least one of a network, a file system, application memory, or standard input.

4. The method of claim 1, further comprising:
   providing random data as input to the software program.

5. The method of claim 1, wherein the flow is altered automatically or by a user.

6. The method of claim 1, wherein tracing and altering the flow of tainted data involve instrumenting the software program, wherein the instrumenting comprises adding new instructions to the software program to perform the tracing or altering.

7. The method of claim 1, further comprising:
   translating uninstrumented executable machine code corresponding to the software program into an intermediate representation;
   adding testing instrumentation into the intermediate representation, wherein the testing instrumentation generates notification messages regarding the tracing; and translating the intermediate representation including the testing instrumentation back into the executable machine code.

8. The method of claim 7, wherein the altering the flow comprises:
using the notification messages to redirect the flow of the tainted data through the software program, wherein the notification messages indicate at least one of the conditional jump, a system call, a memory access, or a register memory load executed during the tracing.

9. The method of claim 8, wherein altering the flow comprises:
modifying the conditional jump instruction wherein the instruction corresponds to at least one of the notification messages.

10. The method of claim 1, wherein altering the flow comprises:
determining a memory address of a function call; and
adding an instruction to the software program that causes the flow to jump to a next physical instruction in the software program subsequent to the function call.

11. The method of claim 1, wherein altering the flow comprises:
modifying the conditional jump instruction within the software program, wherein the modifying the conditional jump causes the flow to follow a specified branch of the conditional jump, wherein another portion of the software program corresponding to the specified branch that was not previously tested is tested during the subsequent execution.

12. A system for testing a software program, comprising:
a taint tracing tool implemented on a processor, configured to trace a flow of tainted data through the software program during execution of the software program;
a flow modification tool configured to alter the flow by modifying a conditional jump instruction without modifying an input value to the conditional jump instruction within the software program based on the trace, wherein one or more instructions of the software program that were executed during the tracing are not executed during a subsequent execution of the software program after the conditional jump instruction was modified; and
an analysis tool configured to:
monitor a behavior of the software program during a subsequent execution of the software program after the conditional jump instruction was modified; and
analyze a correctness of the software program using the monitored behavior.

13. The system of claim 12, wherein the taint tracing tool is further configured to:
assign taint to the tainted data based on a data source associated with the software program.

14. The system of claim 13, wherein the data source corresponds to at least one of a network, a file system, application memory, or standard input.

15. The system of claim 12, wherein a fuzz testing tool is configured to provide random data as input to the software program.

16. The system of claim 12, wherein instrumentation of the software program is performed by the taint tracing tool and the flow modification tool, wherein the flow modification tool is configured to insert the instrumentation into an intermediate version of the software program that causes the flow to jump over a function call of the software program or alter the flow through the conditional jump instruction without modifying the input value to the conditional jump instruction, and wherein the analysis tool is configured to monitor the behavior of an executable version of the software program that includes the inserted instrumentation.

17. The system of claim 12, wherein the analysis tool is configured to analyze the correctness of the software program by detecting faults in the software program.

18. A non-transitory computer-readable storage medium storing instructions that when executed by a computer cause the computer to perform a method for testing a software program, the method comprising:
tracing a flow of tainted data through the software program during execution of the software program;
altering the flow by modifying a conditional jump instruction without modifying an input value to the conditional jump instruction within the software program based on the tracing, wherein one or more instructions of the software program that were executed during the tracing are not executed during a subsequent execution of the software program after the conditional jump instruction was modified;
monitoring a behavior of the software program during a subsequent execution of the software program after the conditional jump instruction was modified; and
analyzing a correctness of the software program using the monitored behavior.

19. The computer-readable storage medium of claim 18, the method further comprising:
assigning taint to the tainted data based on a data source associated with the software program.

20. The computer-readable storage medium of claim 19, wherein the data source corresponds to at least one of a network, a file system, application memory, or standard input.

21. The computer-readable storage medium of claim 18, wherein tracing and altering the flow of tainted data involve instrumenting of the software program.

22. The computer-readable storage medium of claim 18, wherein analyzing the correctness of the software program involves detecting faults in the software program.

* * * * *